Nov. 7, 1967  J. C. ORKNEY, JR., ET AL  3,350,934
APPARATUS FOR USE IN MEASURING THE HYDRAULIC EFFICIENCY OF
FLUID MACHINES, SUCH AS PUMPS
Filed Oct. 22, 1965
2 Sheets-Sheet 1
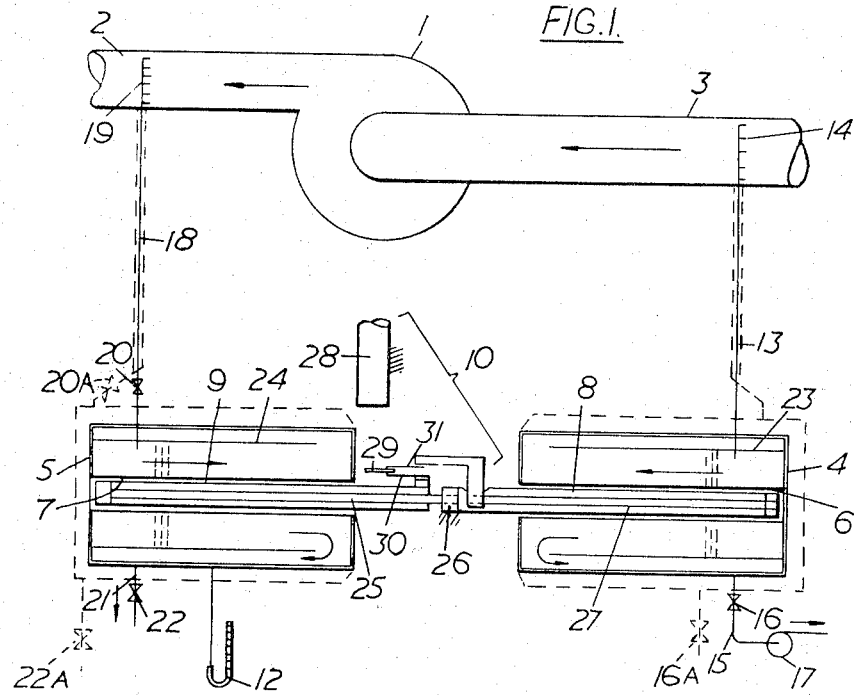
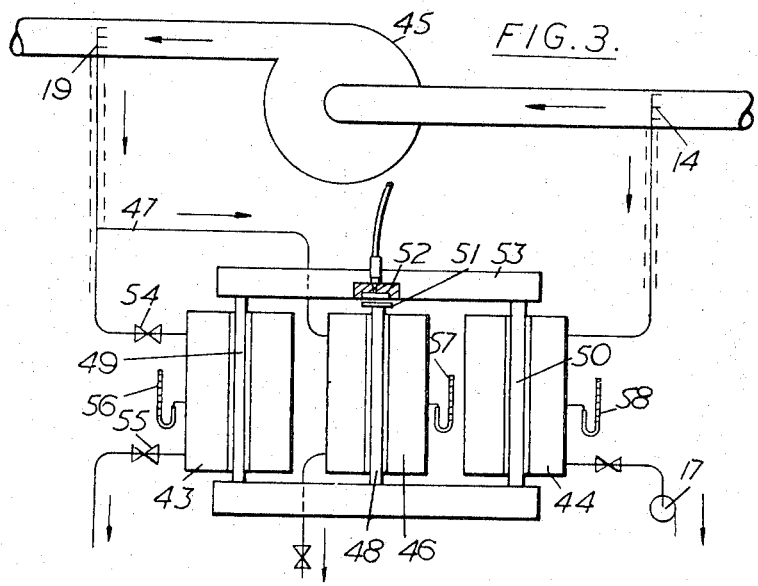
Inventors
John Carnegie Orkney, Jr.
John Carnegie Orkney
By
Rommel, Allwine & Rommel
Attorneys

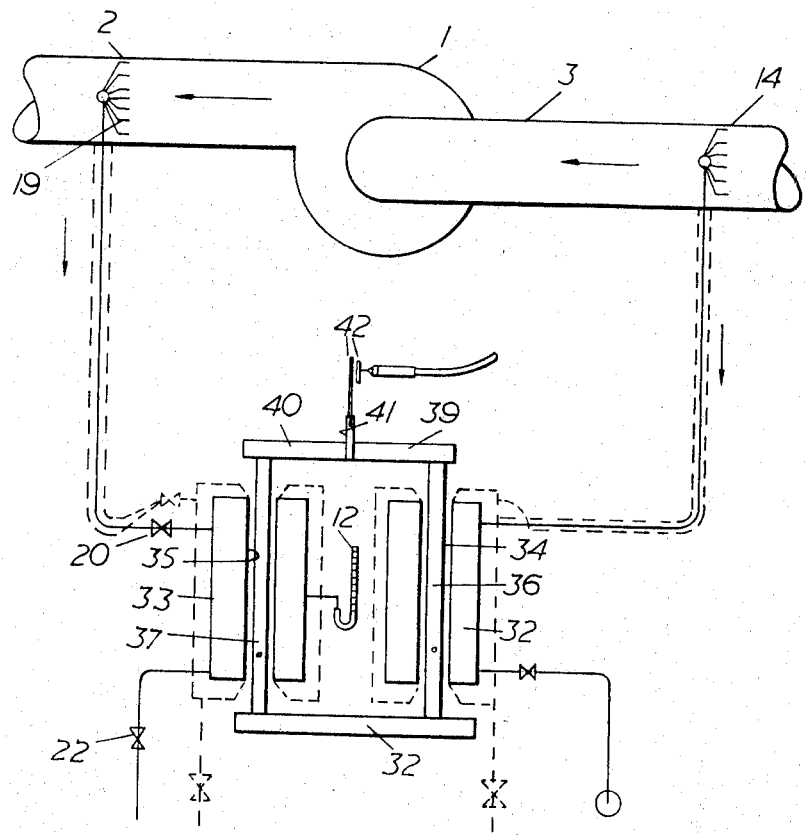

United States Patent Office 3,350,934
Patented Nov. 7, 1967

3,350,934
APPARATUS FOR USE IN MEASURING THE HYDRAULIC EFFICIENCY OF FLUID MACHINES, SUCH AS PUMPS
John C. Orkney, Jr., The Coach House, Drummond Place Lane, Stirling, Scotland, and John C. Orkney, 92 Switchback Road, Bearsden, Glasgow, Scotland
Filed Oct. 22, 1965, Ser. No. 501,286
2 Claims. (Cl. 73—168)

ABSTRACT OF THE DISCLOSURE

The hydraulic efficiency of a pump is determined by sampling the input and output lines and passing the samples through separate containers containing temperature sensors and noting a temperature difference. Constant temperature fluid is then pased through the containers, and the flow through one container is throttled at the inlet to duplicate this temperature difference. Efficiency may be calculated from the pressure drop across the throttle and the original pressure drop across the pump. A modification uses three containers, connecting two to the output side of the pump and making all measurements simultaneously.

---

This invention relates to apparatus for use in measuring the hydraulic efficiency of fluid machines such as pumps.

In both thermometric and thermodynamic methods of measuring the hydraulic efficiency of fluid machines such as pumps, use is made of the fact that release of liquid pressure results in a rise in the temperature of the liquid proportionate to the pressure alteration.

The principle of the conservation of energy leads to the recognised mechanical energy to heat energy conversion factor of approximately 778 ft.-lb./B.t.u., or 1400 ft.-lb./C.h.u. (Centigrade heat unit); from which it has been established that an incompressible liquid flowing through a throttling device, without change of state or heat exchange with its surroundings, would show an increase in temperature, at the rate of 1° C. per 1400 ft. head loss. ("Thermodynamic Method of Measuring Turbine Efficiency," D. N. Singh, M.E.R.L. Fluids Report No. 70, August 1958, N.E.L., East Kilbride, Scotland. "Efficiency Measurements for Hydraulic Turbines by the Poirson Thermometric Method," Willm & Campmas, La Houille Blanche Nos. 4, and 5, 1954.) In water, which is a slightly compressible liquid, this rate is modified by the variations in specific volume and internal energy with temperature and pressure. Values of these variations are available in the literature and are known as the alpha and beta factors.

Further, the losses in mechanical energy in hydraulic machines which appear as heat in the discharge from the machine are related in the same manner.

In the thermometric method, platinum resistance thermometers are usually used to measure directly the liquid temperature at the entry and discharge of the machine, and from these temperatures the hydraulic efficiency of the machine is obtainable. Accurate measurements by this method are very difficult to obtain.

In the thermodynamic method also, platinum resistance thermometers are usually used.

In the foregoing methods, the platinum resistance thermometers are unsatisfactory in that they tend to suffer from hysteresis, aging and unsteadiness, and require annealing or acclimatization after a journey. Moreover, in the thermodynamic method the bridge network may form an expensive and heavy part of the apparatus.

The object of the present invention is to provide considerably increased accuracy in the measurement of hydraulic efficiency.

According to the present invention, apparatus for use in measuring the hydraulic efficiency of fluid machines, such as pumps, comprises high and low pressure containers adapted to permit through flow of sample liquid from the entry and discharge of the machine, a plurality of thermally expansible elongated elements respectively associated with said containers so as to receive heat from the liquid samples, and measuring means operatively connected to the elements so as to indicate changes in the dimensions of the elements and thereby enable the hydraulic efficiency of the machine to be determined.

Preferably the measuring means are adapted to give a null balance indication when the lengths of the elements are the same, and the high-pressure container has inlet and outlet throttle valves to enable adjustment of the liquid temperature for null balance, and has a gauge for measuring the liquid pressure.

The measuring means may be optical, such as a microscope or an auto-collimator, or may be electronic, such as a capacitance or inductance meter.

Embodiments of the invention will now be described by way of example, with reference to the accompanying diagrammatic drawings in which FIGS. 1, 2 and 3 respectively show different forms of apparatus operatively connected to a pump.

Referring to FIG. 1, apparatus for use in measuring the hydraulic efficiency of a pump 1 with an inlet pipe 3 and a discharge pipe 2, includes a pair of spaced horizontal co-axial cylindrical containers 4 and 5 connected respectively to the inlet pipe 3 and the discharge pipe 2 to receive water samples therefrom. The containers have central axial through passages 6 and 7 respectively, and a pair of identical cylindrical brass tubes 8 and 9 extend concentrically within the passages 6 and 7 respectively, the tubes being expansible under the action of heat from the water in the containers. Indicating means 10 are connected to the ends of the tubes 8 and 9 to indicate changes in the dimensions of the tubes, and a manometer 12 is connected to the container 5 to indicate the water pressure in the container. A pipe line 13 extends from a sampler 14 in the inlet pipe 3 and delivers into the low pressure container 4 and the water sample is discharged from the container 4 through a pipe 15 which has therein a control valve 16 and a suction pump 17. A pipe line 18 extends from a sampler 19 in the discharge pipe 2 and delivers, through a throttle valve 20, into the high-pressure container 5, and the water sample is discharged from the container 5 through a throttle valve 22 in a pipe 21. Cylindrical baffles 23 and 24 mounted concentrically within the containers 4 and 5 ensure axial flow of the sample water through the containers, over the inner walls thereof.

The pipe lines and containers are fitted with water-jackets, as indicated in broken lines, and water-flow through the jackets from the inlet and discharge pipes is controlled by valves 16A, 20A and 22A which are duplicates of the valves 16, 20 and 22. Moreover, the jackets are lagged and may in addition be surrounded by air jackets in the form of ducts through which air is forced from a common source by a fan, blower or the like. Thus, thermal gains or losses to the samples are minimized. Further, since it is desirable to keep the remaining thermal gains or losses as similar as possible in both samples, both pipe lines are the same length, and apparatus is provided to show that the rates of flow or the pressure losses through both pipe lines and both jackets are similar, the rates being controlled by the throttle and control valves. Moreover, to minimize the effect of variation in the inlet water temperature, valve or other control means (not shown) are provided to enable adjustment of the rate of flow of the inlet sample so that the time taken by the sample to reach its container is similar to the time taken for the main body of water to pass through the pump and for the discharge sample to reach its container.

The brass tube 9 is mounted on the outer end of a carrier rod 25 of Invar or other low-expansion material which extends co-axially within the tube 9 and is anchored at its inner end to a fixed abutment 26. The brass tube 8 is anchored at its inner end to the abutment 26 and is secured at its outer end to the adjacent outer end of an Invar rod 27 extending co-axially within the tube 8. The indicating means 10 consists of an auto-collimator 28 which views a mirror 29 carried by a pair of parallel leaf springs 30 and 31 connected respectively to the free outer end of the tube 9 and the free outer end of the rod 27.

Differences in the comparative lengths of the tubes 8 and 9 are converted by the leaf springs into a corresponding tilting movement of the mirror 29, and the auto-collimator 28 measures the corresponding change in angle of a light beam reflected from the mirror.

Modifications may be made. Thus in the indicating means the tubes or rods may be replaced by bi-metallic strip in flat or coiled form. The containers may be arranged concentrically one within the other, with the expansible members in the space between the containers.

In the form shown in FIG. 2, the apparatus consists of a pair of side-by-side upright cylindrical containers 32 and 33 with central axial through passages 34 and 35 respectively. A pair of identical brass rods 36 and 37 extend through the passages 34 and 35 which may contain oil as a heat transfer medium, and are interconnected at their lower ends by a bar 38, and have lateral arms 39 and 40 at their upper ends. A movement magnifier including a pair of parallel leaf springs 41 connects the arms 39 and 40 to a plate of electronic capacitance meter including a pair of capacitance plates 42, said plate moving towards and from the other plate with variations in the length of one rod relative to the length of the other.

The zero point of the instrument of FIG. 1 or 2 is established by allowing liquid from a common source, and hence of identical temperature, to flow through both containers with the inlet throttle valves open fully. Next, the instrument is connected across the pump under test with liquid samples from the high and low pressure sides of the pump flowing through the H.P. and L.P. containers respectively. The difference in temperature between these samples is noted in the form of a reading, relative to the zero point previously established, on the auto-collimator 28 of FIG. 1 or on the capacitance meter of FIG. 2. Liquid of identical temperature from a common high pressure source, conveniently the high pressure side of the pump under test, is then again allowed to flow through both containers, and the throttle valve at inlet to the H.P. container is then adjusted until the same reading as above is obtained on the auto-collimator or capacitance meter. Manometer 12, shown as open to atmosphere in FIGS 1 and 2, is then connected with one limb to a T off the sample line 18 (FIG. 1) and with the other limb to the H.P. container as shown. The pressure drop $h$ across the inlet throttle valve 20 (FIG. 1) as adjusted above is thus noted. With a pump generated head H, the efficiency of the pump is given by $(H)/H(+h) \times$ (correction factors).

The various cross connections used to facilitate changes to and from the various modes of operation are omitted from the figures for clarity, particularly since the making of such connections and the means for measuring pump generated head are common-place to the art of testing such machines. It will be understood that variations in the above technique are possible. For example, the auto-collimator or capacitance meter readings can be calibrated in terms of $h$ in advance of a pump test by noting the readings against the corresponding pressure drop across the inlet throttle valve. The pump test then consists merely of connecting the instrument as shown in FIGS. 1 or 2, taking the autocollimator or capacitance meter reading, and measuring the pump generated head H.

In the apparatus of FIG. 3 for measuring the hydraulic efficiency of pumps, particularly when the efficiency is over 50% and there is insufficient pressure on the low pressure (cold) side of the pump to permit of heating by throttling, the high-and-low pressure containers 43 and 44 are connected to the high-and-low pressure sides respectively of the pump 45, while a third container 46, between and in line with the other two containers and equispaced therefrom, is connected through conduit 47 to the high-pressure side to receive a water sample. Said container 46 has its rod 48, which is identical with the other two rods 49 and 50, connected directly to one plate 51 of the capacitance meter, while the other two rods 49 and 50 are together connected directly to the other plate 52 by a bar 53.

With the liquid samples flowing through the containers 44 and 46, the rod 48 of the container 46 expands and this expansion is shown on the meter. By suitably adjusting the throttle valves 54 and 55 of the high-pressure container 43, the rod 49 of the latter is heated and expands to give a null reading on the meter. The pressures in the three containers are then measured by means of manometers 56, 57 and 58, and the hydraulic efficiency of the pump 45 calculated from these pressures. After correction for the changes in the properties of water with temperature and pressure, the efficiency of a pump is given by dividing the total head produced by the pump, by the sum of this total head and that head which when occurring across a throttling device results in the same temperature rise as that caused to the flow through the pump by its energy losses. If $H_{56}$, $H_{57}$ and $H_{58}$ denote the heads read off manometers 56, 57 and 58, this efficiency calculation becomes $$(H_{57}-H_{58})/(2H_{57}-H_{58}-H_{56}) \times \text{(correction factors)}$$

By modifying the spacing of the containers and therefore of the rods, it is possible to adapt the apparatus for pump efficiencies of under 50%.

By the use of expansible tubes or rods and an indicator for measuring physical displacement of the tubes or rods, instead of resistance thermometers and a bridge circuit, the apparatus is rendered considerably more accurate, and moreover is more robust.

It will be appreciated that the brass tubes or rods may be replaced by tubes, rods or the like of metal or other material of suitable thermal expansion.

Whatever form of indicator is used, it will usually be possible, and desirable, to use the indicator on a null method basis. Calibration to this end is achieved by setting up the apparatus with fluid of the same temperature (preferably from the same source and not throttled) passing through both (or all) containers simultaneously and, while both (or all) tubes or rods are thus at identical temperatures, setting the indicator to a suitable null point which is regained when the throttling adjustments described above are completed.

We claim:
1. Apparatus for use in measuring the hydraulic efficiency of fluid machines such as pumps having entry and discharge passages, first and second sampling members located respectively in said inlet and discharge passages for removal of sample liquid from said passages, low and high pressure end containers in connection with said first and second sampling members respectively and through which flow liquid samples from the machine, a high pressure intermediate container in connection with said second sampling member and through which flow liquid samples from the machine, a plurality of thermally expansible elongated elements extending within said containers so as to receive heat from the liquid samples, measuring means operatively connected to said elements so as to indicate changes in the dimension of the elements and to give a null balance indication when the lengths of the elements are the same, inlet and outlet throttle valves for the high pressure end container to enable adjustment of the liquid temperature therein for null balance, and pressure gauges for measuring the liquid pressure in each of said containers, the hydraulic efficiency of the machine being calculated from the pressures sensed by said pressure gauges.

2. Apparatus as specified in claim 1 wherein said measuring means comprises an electronic capacitance meter having opposed plates, the element of the intermediate container being connected to one plate and the elements of the end containers being connected to the other plate.

References Cited

UNITED STATES PATENTS

| | | | |
|---|---|---|---|
| 1,522,273 | 1/1925 | Rissman | 73—112 |
| 2,357,921 | 9/1944 | Xenis et al. | 73—112 |
| 2,593,659 | 4/1952 | Dickey | 73—112 |
| 2,826,067 | 3/1958 | Braunlich | 73—168 |
| 2,924,971 | 2/1960 | Schroeder et al. | 73—168 |
| 3,064,476 | 11/1962 | Naples | 73—363 |
| 3,123,697 | 3/1964 | Grimshaw | 73—363 X |
| 3,225,591 | 12/1965 | Orkney et al. | 73—168 X |

LOUIS R. PRINCE, *Primary Examiner.*

J. NOLTON, *Assistant Examiner.*

UNITED STATES PATENT OFFICE
CERTIFICATE OF CORRECTION

Patent No. 3,350,934                                  November 7, 1967

John C. Orkney, Jr., et al.

It is hereby certified that error appears in the above numbered patent requiring correction and that the said Letters Patent should read as corrected below.

Column 1, before line 27, insert the following
      This application is a continuation-in-part of our previously co-pending application Serial No. 209,809, filed July 11, 1962, now Patent No. 3,225,591, dated Dec. 28, 1965.
column 3, line 67, for "(H)/H(+h)×" read -- (H)/(H+h) × --.

Signed and sealed this 19th day of November 1968.

(SEAL)
Attest:

Edward M. Fletcher, Jr.                              EDWARD J. BRENNER
Attesting Officer                                         Commissioner of Patents